United States Patent
Cirillo (10) Patent No.: US 9,878,741 B2
(45) Date of Patent: Jan. 30, 2018

(54) SENSOR ARRANGEMENT ON A STEERING COLUMN OF A MOTOR VEHICLE

(71) Applicant: VALEO Schalter und Sensoren GmbH, Bietigheim-Bissingen (DE)

(72) Inventor: Michael Cirillo, Buchen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 3 days.

(21) Appl. No.: 14/783,442

(22) PCT Filed: Apr. 11, 2014

(86) PCT No.: PCT/EP2014/057363
§ 371 (c)(1),
(2) Date: Oct. 9, 2015

(87) PCT Pub. No.: WO2014/167090
PCT Pub. Date: Oct. 16, 2014

(65) Prior Publication Data
US 2016/0052550 A1 Feb. 25, 2016

(30) Foreign Application Priority Data
Apr. 13, 2013 (DE) .......................... 10 2013 006 378

(51) Int. Cl.
*B62D 15/02* (2006.01)
*B62D 6/10* (2006.01)

(52) U.S. Cl.
CPC ........... *B62D 15/0215* (2013.01); *B62D 6/10* (2013.01)

(58) Field of Classification Search
CPC .............................. B62D 15/0215; B62D 6/10
(Continued)

(56) References Cited

U.S. PATENT DOCUMENTS

| 2002/0021223 A1* | 2/2002 | Jen .......................... G08B 25/10 340/628 |
| 2002/0065592 A1* | 5/2002 | Lin .......................... B62D 6/10 701/41 |

(Continued)

FOREIGN PATENT DOCUMENTS

| DE | 10 2009 057 361 A1 | 6/2011 |
| EP | 2 672 233 A2 | 12/2013 |

OTHER PUBLICATIONS

International Search Report issued in corresponding application No. PCT/EP2014/0573634 dated Sep. 16, 2014 (2 pages).
(Continued)

*Primary Examiner* — Redhwan K Mawari
*Assistant Examiner* — Rodney P King
(74) *Attorney, Agent, or Firm* — Osha Liang LLP (57) ABSTRACT

The invention relates to a sensor arrangement on a steering column (2) of a motor vehicle and consists of at least two sensors (10, 11, 20, 21) for redundant capture of the torque applied to the steering column (2) and/or for capture of the rotation angle of the steering column (2). The sensors (10, 11, 20, 21) of the sensor arrangement (9) are connected to a power supply (VDD, GND) via electrical lines (30, 31, 32, 33), each of the sensors (10, 11, 20, 21) transmitting data to a controller (8) via a signal line (16, 17, 26, 27). In order to reduce the number of connecting cables to the controller (8), provision is made for the signal lines (16, 17, 26, 27) from two sensors (10, 11, 20, 21) to be connected to the controller (8) via a common data line (34, 35, 36). Each sensor (10, 11, 20, 21) can be individually actuated by the controller (8) via the data line (34, 35, 36) and the signal line (16, 17, 26, 27) such that a signal (53) from the controller (8) prompts the addressed sensor (10, 11, 20, 21) to output its data to the
(Continued)

controller (8) via the signal line (16, 17, 26, 27) and the data line (34, 35, 36).

9 Claims, 6 Drawing Sheets

(58) Field of Classification Search
USPC .......................................................... 701/41
See application file for complete search history.

(56) References Cited

U.S. PATENT DOCUMENTS

2010/0023212 A1    1/2010  Kim
2012/0158335 A1*   6/2012  Donovan ........... G05B 19/0423
                                                      702/79

OTHER PUBLICATIONS

Infineon Technologies AG: "Volkswagen to Use Infineon Sensor Chip in Electric Power Steering Systems—Infineon Technologies"; Jan. 11, 2011; XP055137888, URL:http://www.infineon.com/cms/en/corporate/press/news/releases/2011/INFATV201101-0 16.html (3 pages).

* cited by examiner

SENSOR ARRANGEMENT ON A STEERING COLUMN OF A MOTOR VEHICLE

The invention relates to a sensor arrangement on a steering column of a motor vehicle according to the preamble of Claim 1.

DE 10 2009 057 361 A1 discloses a torque sensor arrangement that is arranged physically adjacent to a steering column switch module arranged on the steering column in order to keep down the wiring complexity.

The invention is based on the object of developing a sensor arrangement on a steering column of a motor vehicle such that the wiring complexity with a controller is reduced.

The object is achieved according to the features of Claim 1.

When the signal lines from at least two sensors are connected to the controller via a common data line, one data line from the sensor to the controller can be dispensed with. Each of the sensors can be individually actuated by the controller via the data line and the signal line with a signal from the controller prompting the respectively addressed sensor to output its data to the controller via the signal line and the data line.

Advantageously, two sensors in each case are connected to a power supply via a common voltage connection, so that the wiring complexity for the supply of power is also lowered.

In individual cases, it may be expedient for all the sensors of the sensor arrangement to be connected to a common power supply via just one supply line.

In a development of the invention, a plurality of torque sensors and a plurality of rotation angle sensors are provided, one torque sensor and one rotation angle sensor in each case being connected to the controller via a common data line. Particularly when the torque sensors and rotation angle sensors are present in redundant form, the cables leading to the controller can thus be reduced to a small number.

In order to ensure redundancy, a torque sensor and the rotation angle sensor associated therewith are advantageously connected to the power supply via a common voltage connection. Respective pairs comprising a torque sensor and a rotation angle sensor are thus connected to separate power supplies.

In order to minimize the number of cables between the sensor arrangement and the controller further, provision is made for all the torque sensors and all the rotation angle sensors to be connected to the controller via a common data line. If, furthermore, all the sensors of the sensor arrangement are connected to a common power supply via just one supply line, the number of cable connections is reduced to no more than three.

In an advantageous development of the invention, the controller communicates with the sensors using a Short PWM Code protocol that can be used in a simple manner to address the sensors that are to be interrogated. To this end, provision is made for the controller to actuate an associated sensor for data output over the different lengths of time of a Low signal of a trigger pulse from the controller.

Advantageously, the sensors are combined in a common modular unit, the modular unit being arranged on the steering column of a motor vehicle.

Further features of the invention can be found in the further claims, the description and the drawing, which shows exemplary embodiments of the invention that are described in detail below. In the drawing:

Figure 1:
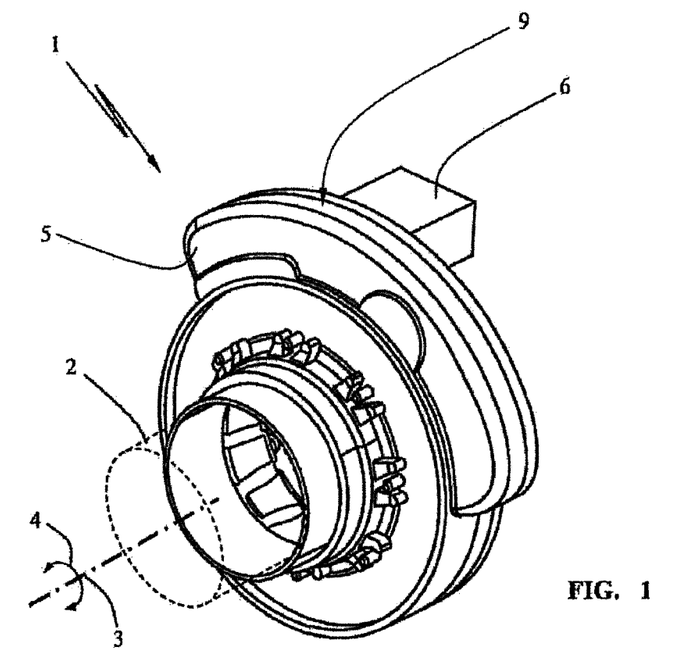
FIG. 1 shows a schematic illustration of a sensor module for the steering column of a motor vehicle.

The sensor module 1 shown in FIG. 1 is arranged on a steering column 2—shown in dashed lines—of a motor vehicle and can be rotated about a longitudinal axis 3 in the direction of the double-headed arrow 4. The sensor module 1 comprises a sensor arrangement 9 that can be used to capture the torque and/or the rotation angle of the steering column 2. The sensor arrangement 9 is combined in a modular unit 5 that is part of the sensor module 1. A plug connection 6 is used to electrically connect the sensor arrangement 9 to a controller 8.

In the exemplary embodiment shown in FIG. 1, the sensor arrangement 9 consists of two torque sensors 10 and 11 and two rotation angle sensors 20 and 21. The sensors 10, 11, 20 and 21 are held in a housing of the modular unit 5 of the sensor arrangement 9, two torque sensors 10 and 11 being arranged on a common board 19 and two rotation angle sensors 20 and 21 being arranged on a common board 29. The boards 19 and 29 are fixed in the modular unit 5 mechanically.

Each sensor 10, 11, 20, 21 has voltage connections 12, 14, 13, 15, 22, 24 and 23 and 25 and also a signal connection for one signal line 16, 17, 26, 27 in each case.

The modular unit 5 of the sensor arrangement 9 is connected by means of a cable 40 to a controller 8 to which the signals from the sensors 10, 11, 20 and 21 are supplied.

Figure 2:
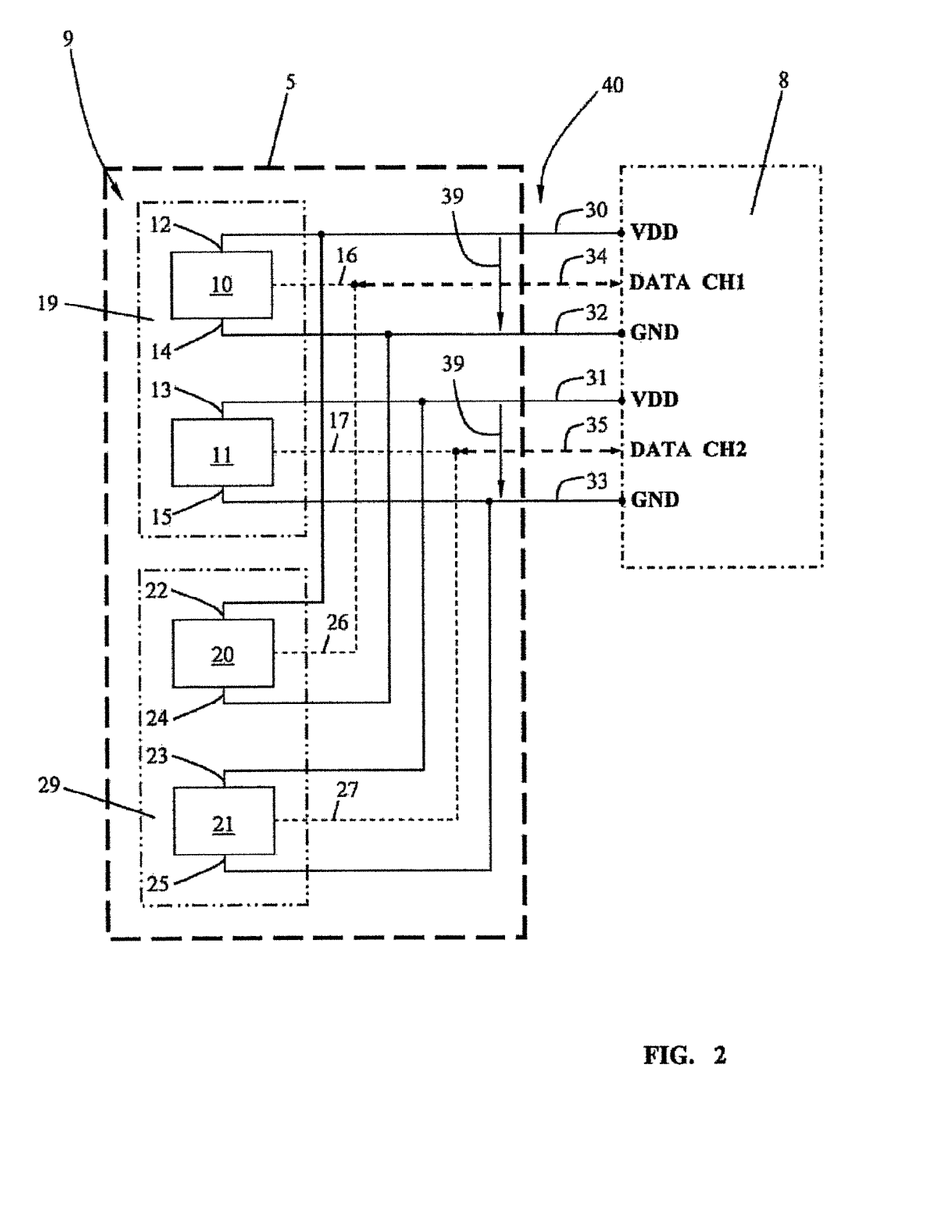
FIG. 2 shows a schematic illustration of a sensor arrangement for use in a steering module as shown in FIG. 1.

As FIG. 2 shows, the power supply of the rotation angle sensor 20 is coupled to the power supply 39 of the torque sensor 10. To this end, the voltage connection 22 is connected to the voltage connection 12, so that both voltage connections 12 and 22 are connected to a pole of the external voltage source VDD, preferably the positive pole of the external voltage source VDD, via a common electrical line 30. Correspondingly, the voltage connections 14 and 24 of the sensors 10 and 20 are combined and are connected to the negative pole of the voltage source VDD, or the ground GND thereof, jointly via the electrical line 32.

The signal line 26 of the torque sensor 20 is electrically connected to the signal line 16 of the torque sensor 10; both signal lines 16 and 26 are connected to the controller 8 via a common data line 34 between the sensor arrangement 9 and the controller 8 to form a data channel DATA CH1.

In corresponding fashion, the signal lines 17 and 27 of the sensors 11 and 21 are connected to one another and are connected to the controller 8 via a data line 35 as a second data channel DATA CH2. The electrical power supply 39 of the rotation angle sensor 21 is connected in corresponding fashion to the electrical power supply of the torque sensor 11; the connections 13 and 23 are connected to the voltage source VDD jointly via the electrical line 31. The voltage connections 15 and 25 are connected to the other pole of the voltage source, particularly the ground GND thereof, jointly via the electrical line 32.

The sensor arrangement 9 is therefore connected to the controller 8 via just six cables, namely the electrical lines 30, 31, 32 and 33 of the power supply 39 and the data lines 34 and 35.

The power supply 39 of the sensors 10 and 20 (torque sensor 10, rotation angle sensor 20) connected in parallel with one another is independent of the power supply 39 of the parallel-connected sensors 11 and 21 (torque sensor 11, rotation angle sensor 21). The data output from the sensors 10, 20; 11, 21 connected in parallel with one another is effected via a respective common data channel, namely the data line 34 or 35.

Figure 3:
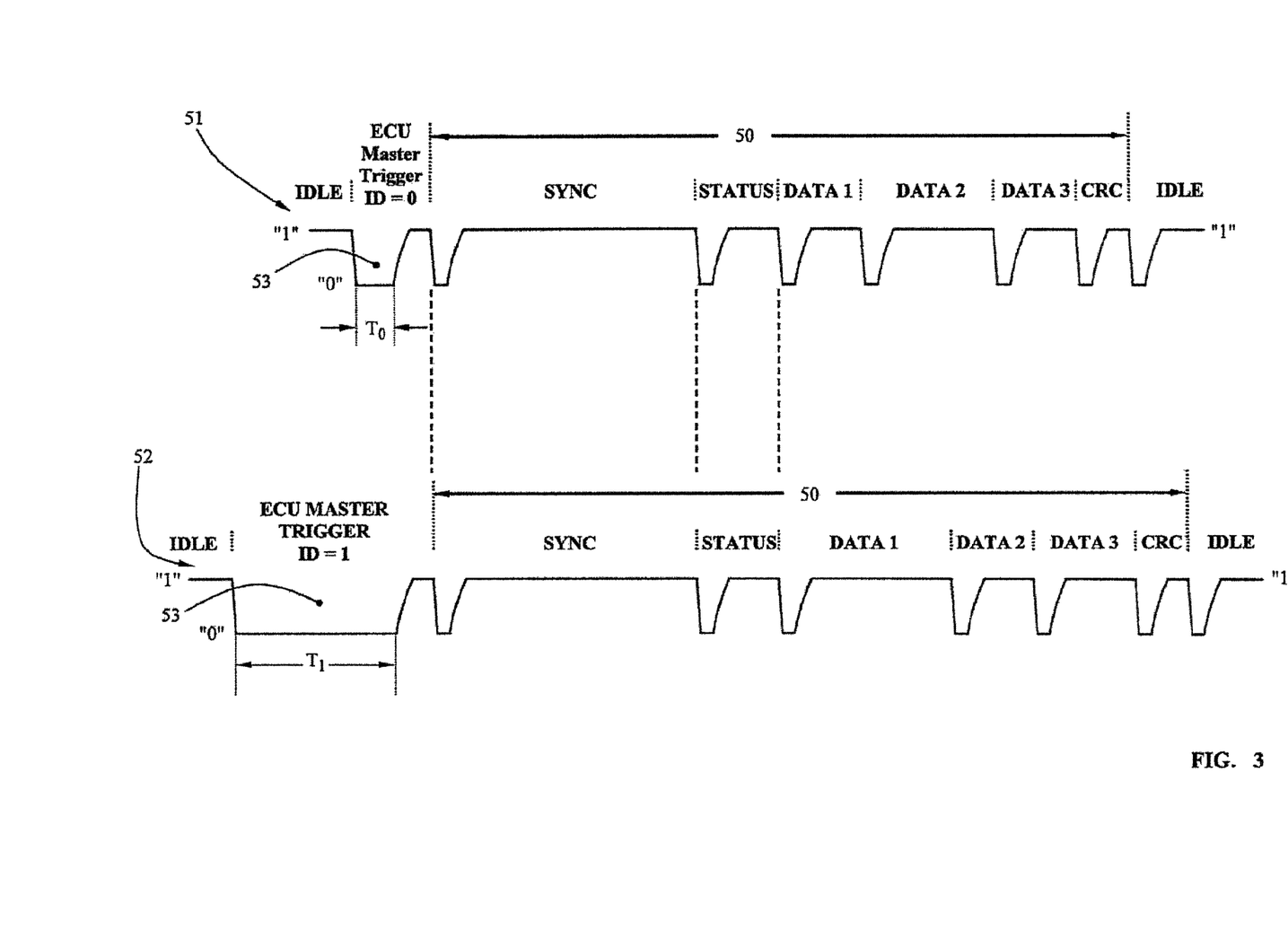
FIG. 3 shows a schematic signal train for a Short PWM Code protocol.

The communication between the controller 8 and the respective sensors 10, 11, 20, 21 is effected using a Short PWM Code (SPC) protocol, the signal train of which is reproduced by way of example in FIG. 3. Two signal trains 51 and 52 are shown that each comprise a communication section 50. When the system is idling, one data line has the value "1" supplied to it. If the sensor 10 or the sensor 20 is intended to be addressed on the data line 34, for example, then during idling the trigger signal from the controller 8 is set to "Low". Depending on the duration T of the "Low" signal 53 during idling, either one sensor 10 or the other sensor 20 is addressed. In the exemplary embodiment shown in FIG. 3, a short duration $T_0$ prompts the torque sensor 10 to be addressed, which responds thereto with a synchronization signal SYNC and outputs a status signal. Data are then output by the torque sensor 10 in the signal trains 51 and 52 with the—in the exemplary embodiment—three data blocks DATA1, DATA2 and DATA3. Up to six data blocks may be provided. Following transmission of the data, the torque sensor 10 also sends a CRC (Cyclic Redundancy Check); this is used by the controller 8 in order to check the data integrity of the received data.

If the same data line 34 is intended to be used to address the rotation angle sensor 20, then during idling the controller 8 outputs a Low signal 53, the duration $T_1$ of which is greater, preferably many times greater, than the duration $T_0$ of the Low signal 53 of the signal train 51. The rotation angle sensor 20 reacts to the Low signal 53 of duration $T_1$ with a synchronization signal SYNC and a status signal, after which—in the exemplary embodiment—data are sent to the controller 8 in data blocks DATA1, DATA2 and DATA3. Following transmission of the data, the rotation angle sensor 20 also sends a CRC; this is again used by the controller 8 in order to check the data integrity of the received data. In this way, it is still possible for the controller 8 to address every single sensor given a reduced number of cables or electrical connecting lines between the controller 8 and the modular unit 5. The redundancy of the system is also retained by virtue of the parallel-connected sensors 10, 20; 11, 21 having mutually independent power supplies 39.

Figure 4:
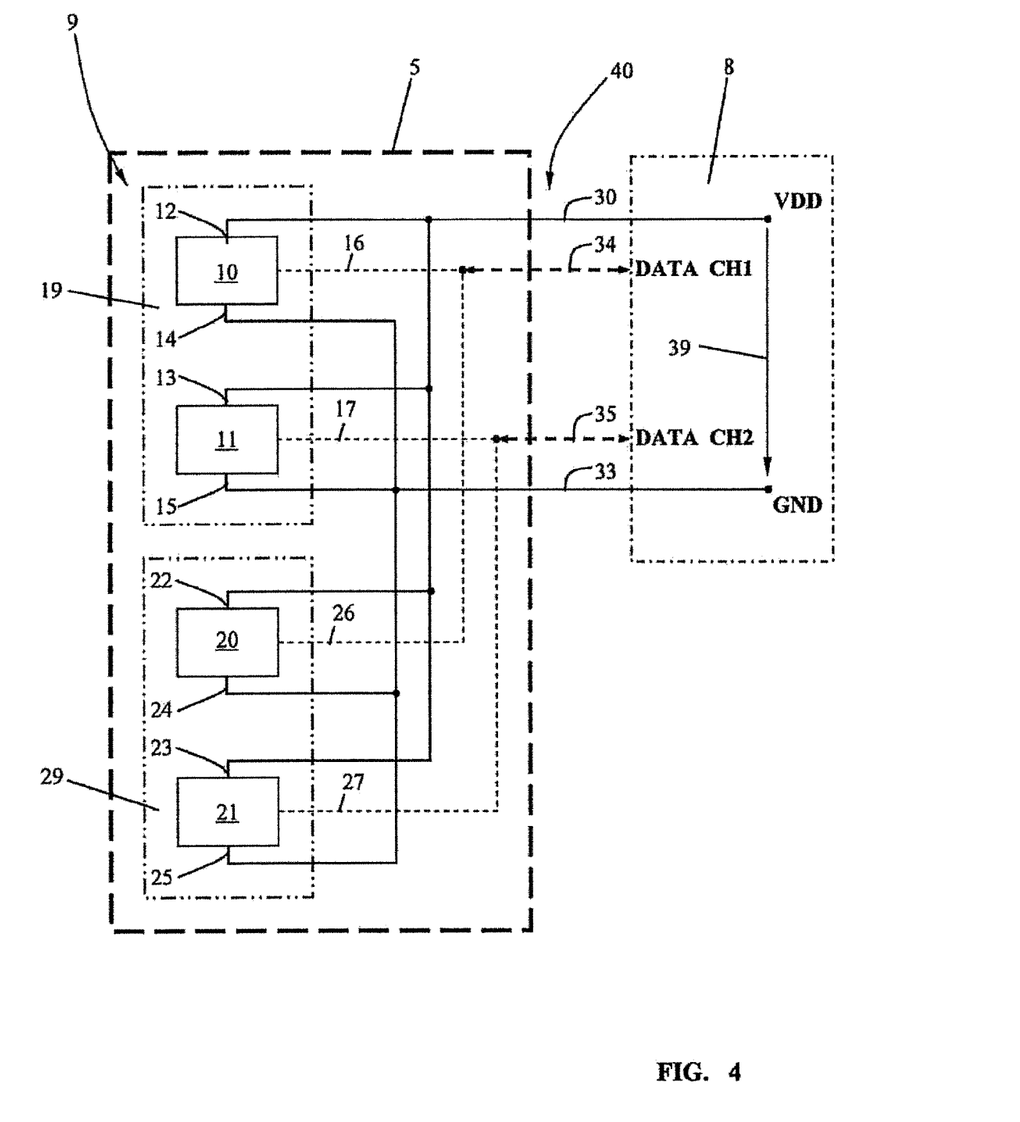
FIG. 4 shows a schematic illustration of a sensor arrangement as shown in FIG. 2 with a common power supply for all the sensors.

Fundamentally, the exemplary embodiment shown in FIG. 4 corresponds to that shown in FIG. 2, which is why the same reference symbols are used for parts that are the same. In contrast to the exemplary embodiment shown in FIG. 2, the voltage connections 12, 13, 22, 23 are connected via the electrical line 30, on the one hand, and the voltage connections 14, 15, 24, 25 are connected via the electrical line 33 jointly to a power supply 39, namely the voltage source VDD. The data lines 34 and 35 again form two separate data channels DATA CH1 and DATA CH2.

The chosen common power supply for all the sensors of the sensor arrangement 9 or the modular unit 5 allows the number of six cables shown in FIG. 2 to be reduced to four cables as shown in FIG. 4.

Figure 5:
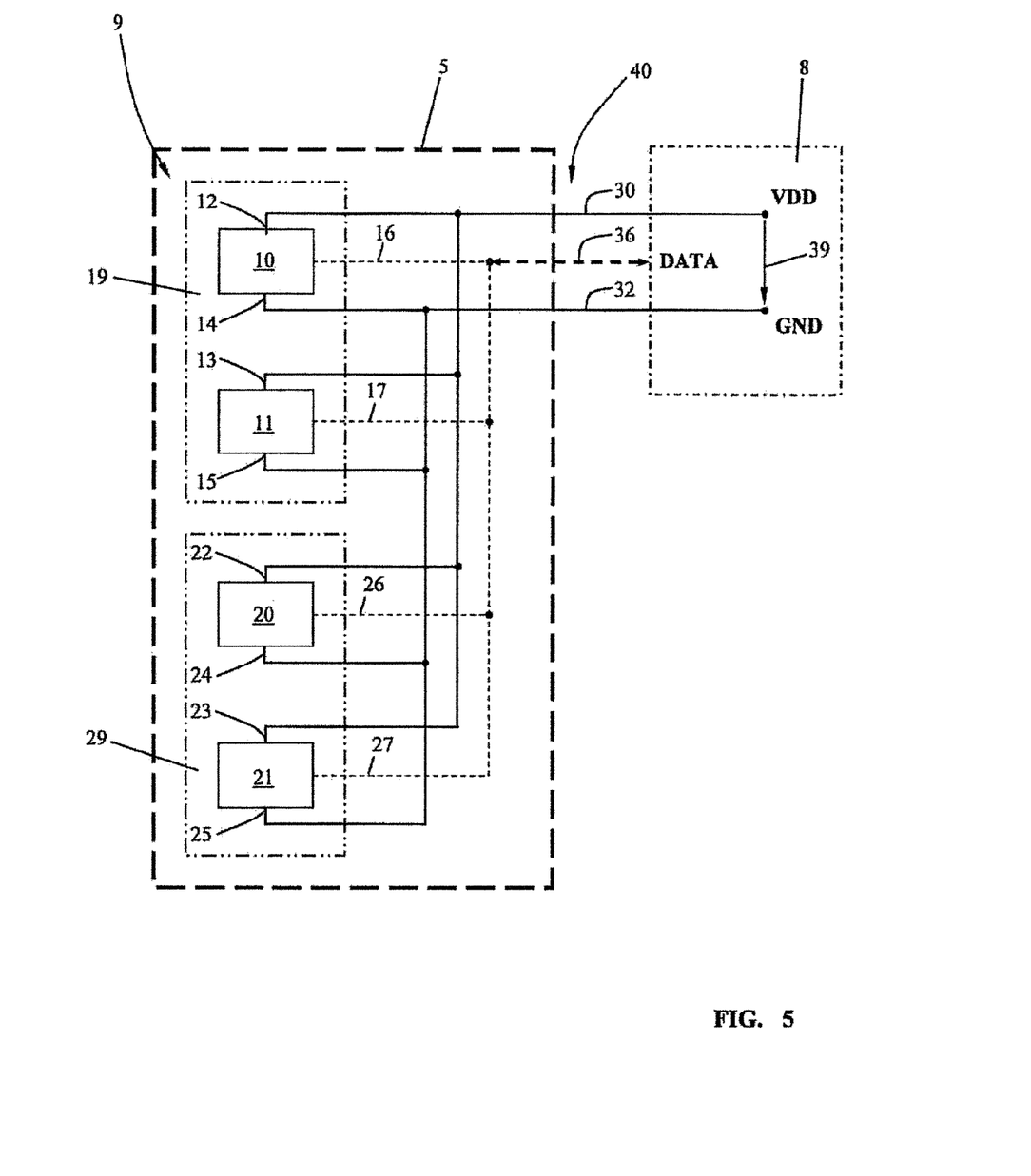
FIG. 5 shows a schematic illustration of a sensor arrangement as shown in FIG. 4 with a common data line for all the sensors.

A further reduction in the connecting cables 40 between the controller 8 and the sensor arrangement 9 or the modular unit 5 is shown in FIG. 5. The representation of the sensor arrangement 9 in FIG. 5 corresponds to that shown in FIG. 4, which is why the same reference symbols are used for parts that are the same. In contrast to the illustration in FIG. 4, all the signal lines 16, 17, 26, 27 in FIG. 5 are connected to one another and are routed via a common data line 36 to the controller 8 on a data channel DATA. With this interconnection of the sensors 10, 11, 20, 21, only three cables are now needed between the controller 8 and the sensor arrangement 9 or the modular unit 5. The SPC protocol (Short PWM Code) can interrogate up to four sensors via the data line 36 in ID Selection mode, as shown in FIG. 5. The controller 8 can decide which of the connected sensors 10, 11, 20, 21 is intended to respond on the common data line 36 solely on the basis of the length of time for a low signal 53 of the master trigger from the controller 8. The controller can thus sequentially read all the sensors 10, 11, 20, 21 via the common data line 36.

Figure 6:
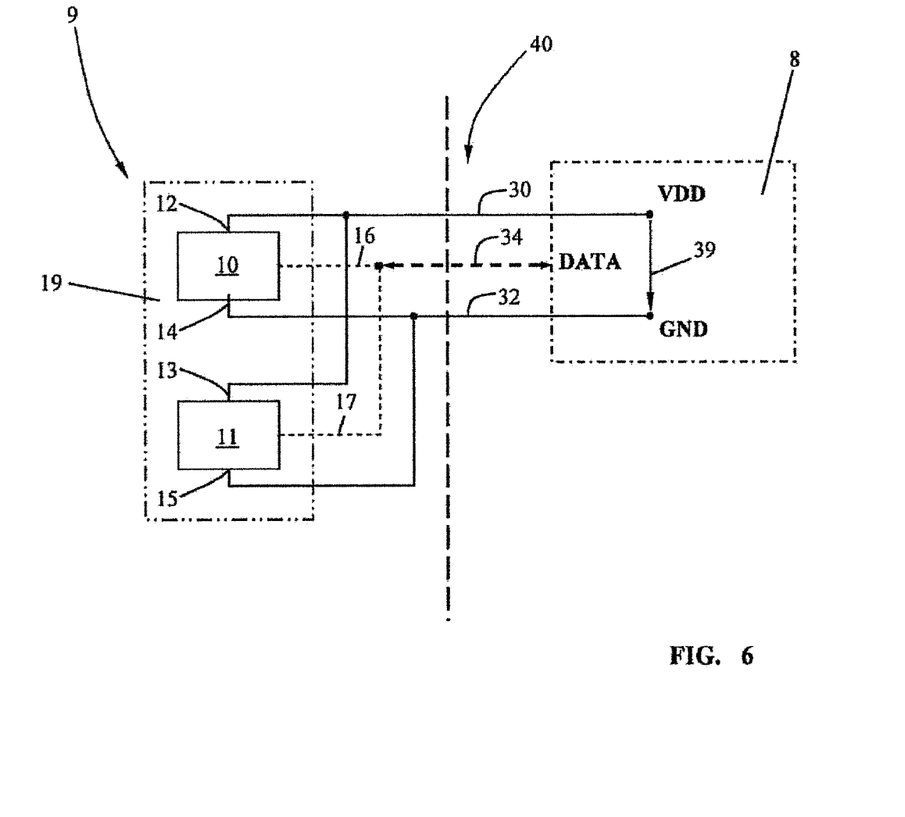
FIG. 6 shows a schematic illustration of a sensor arrangement comprising redundant torque sensors with a common power supply and a common data channel.

In the exemplary embodiment shown in FIG. 6, a sensor arrangement 9 reduced to two torque sensors 10, 11 is shown. The voltage connections 12 and 13, on the one hand, and 14 and 15, on the other hand, of the sensors 10 and 11 are connected in parallel and are connected to a common power supply 39 via electrical lines 30 and 32. The signal lines 16 and 17 are connected to one another and use a common data line 34 as a single data channel DATA to communicate with an external controller 8.

The invention claimed is:

1. A sensor arrangement on a steering column of a motor vehicle, comprising:
    at least two sensors for redundant capture of the torque applied to the steering column and/or for capture of the rotation angle of the steering column,
    wherein the sensors of the sensor arrangement are connected to a power supply via electrical lines and each of the sensors transmits data to a controller via a signal line,
    wherein the signal lines from at least two sensors are connected to the controller via a common data line, and each sensor is individually actuated by the controller via the data line and the signal line in response to a signal from the controller prompting the addressed sensor to output its data to the controller via the signal line and the data line.

2. The sensor arrangement according to claim 1, wherein two sensors in each case are connected to a power supply via a common voltage connection.

3. The sensor arrangement according to claim 2, wherein all the sensors of the sensor arrangement are connected to a common power supply via a common supply line.

4. The sensor arrangement according to claim 1, wherein a plurality of torque sensors and a plurality of rotation angle sensors are provided and one torque sensor in each case together with one rotation angle sensor in each case are connected to the controller via a common data line.

5. The sensor arrangement according to claim 4, wherein a torque sensor and a rotation angle sensor are connected to the power supply via a common voltage connection.

6. The sensor arrangement according to claim 4, wherein all the torque sensors and all the rotation angle sensors are connected to the controller via a common data line.

7. The sensor arrangement according to claim 1, wherein the controller communicates with the sensors using a Short PWM Code protocol.

8. The sensor arrangement according to claim 7, wherein the controller actuates a sensor for data output over the period of a Low signal of a trigger pulse.

9. The sensor arrangement according to claim 1, wherein the sensors are combined in a common modular unit and the modular unit is arranged on the steering column of a motor vehicle.

* * * * *